(12) United States Patent
Kathirvel et al.

(10) Patent No.: US 10,824,624 B2
(45) Date of Patent: Nov. 3, 2020

(54) SYSTEM FOR ANALYZING, OPTIMIZING, AND REMEDIATING A PROPOSED DATA QUERY PRIOR TO QUERY IMPLEMENTATION

(71) Applicant: Bank of America Corporation, Charlotte, NC (US)

(72) Inventors: Umamaheswari Kathirvel, Chennai (IN); Srikanth Padmanabhan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 266 days.

(21) Appl. No.: 16/034,214

(22) Filed: Jul. 12, 2018

(65) Prior Publication Data

US 2020/0019633 A1   Jan. 16, 2020

(51) Int. Cl.
  *G06F 16/24*   (2019.01)
  *G06F 16/2453*   (2019.01)
  *G06N 20/00*   (2019.01)

(52) U.S. Cl.
  CPC ....... *G06F 16/24542* (2019.01); *G06N 20/00* (2019.01)

(58) Field of Classification Search
  CPC .................... G06F 16/24542; G06N 20/00
  See application file for complete search history.

(56) References Cited

U.S. PATENT DOCUMENTS

| 6,141,660 | A * | 10/2000 | Bach ................. G06F 16/289 |
| 6,353,818 | B1 | 3/2002 | Carino |
| 7,031,956 | B1 * | 4/2006 | Lee .................. G06F 16/284 |
| 7,313,576 | B2 | 12/2007 | Clark et al. |
| 7,747,606 | B2 | 6/2010 | Dageville et al. |
| 8,204,900 | B2 | 6/2012 | Gatton et al. |
| 8,219,537 | B1 | 7/2012 | Anderson |
| 8,682,875 | B2 | 3/2014 | Barsness et al. |
| 8,775,413 | B2 | 7/2014 | Brown et al. |
| 9,165,057 | B1 | 10/2015 | Bostian et al. |
| 9,406,047 | B2 | 8/2016 | Albarrak et al. |
| 9,646,065 | B2 | 5/2017 | Samantaray et al. |
| 10,019,450 | B2 | 7/2018 | Samantaray et al. |

(Continued)

*Primary Examiner* — Tarek Chbouki
(74) *Attorney, Agent, or Firm* — Michael A. Springs; Moore & Van Allen PLLC; James C. Edwards

(57) ABSTRACT

Embodiments of the invention enable analyzing, optimizing and remediating a proposed data query prior to query implementation. Embodiments receive a request from a user; in response, perform an initialization comprising connecting to a data management structure; exporting an explain text of the request in a known format; and disconnecting from the data management structure. In response to initialization, embodiments perform a shredding step comprising shredding the explain text of the request; and populating a plurality of metadata tables comprising a superset table required for internal processing. Next, embodiments define or redefine a machine learning algorithm comprising a plurality of rulesets by calling a plurality of macros to act on the request; access a historic log comprising identified performance tuning parameters configured for tuning queries; and use the identified performance tuning parameters and the machine learning algorithm, optimize the query, thereby resulting in an optimized query.

15 Claims, 10 Drawing Sheets

(56) References Cited

U.S. PATENT DOCUMENTS

| | | |
|---|---|---|
| 2002/0169788 A1* | 11/2002 | Lee .................... G06F 16/284 |
| 2006/0294153 A1 | 12/2006 | Kumar et al. |
| 2008/0033977 A1 | 2/2008 | Polizzi |
| 2008/0189239 A1 | 8/2008 | Bawa et al. |
| 2010/0088286 A1 | 4/2010 | Bansode et al. |
| 2010/0169166 A1 | 7/2010 | Bateni et al. |
| 2011/0161371 A1 | 6/2011 | Thomson et al. |
| 2015/0278860 A1* | 10/2015 | Rayanchu ............. G06F 40/205 705/14.45 |
| 2016/0239544 A1* | 8/2016 | Kondo ............... G06F 16/2291 |
| 2016/0364655 A1 | 12/2016 | Muhammad et al. |
| 2017/0109386 A1* | 4/2017 | Baer ................ G06F 16/2282 |
| 2018/0060394 A1* | 3/2018 | Gawande ............ G06F 16/248 |
| 2018/0197128 A1 | 7/2018 | Carstens et al. |
| 2018/0218030 A1 | 8/2018 | Wong et al. |
| 2018/0218031 A1 | 8/2018 | Wong et al. |
| 2018/0218032 A1 | 8/2018 | Wong et al. |
| 2018/0218044 A1 | 8/2018 | Wong et al. |
| 2018/0330001 A1* | 11/2018 | Zhou ...................... H04L 67/22 |
| 2019/0378028 A1* | 12/2019 | Chaudhuri .......... G06F 16/2453 |

\* cited by examiner

SYSTEM FOR ANALYZING, OPTIMIZING, AND REMEDIATING A PROPOSED DATA QUERY PRIOR TO QUERY IMPLEMENTATION

BACKGROUND

Manual interactions between users and third parties that traditionally involve manual or face-to-face conveyance of data and information are inefficient, slow, and often insecure thereby reducing productivity and security associated with all parties involved. As such, there exists a need for a system to improve the efficiency, speed, and data security when performing interactions.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for analyzing, optimizing and remediating a proposed data query prior to query implementation.

Embodiments receive a request from a user; in response, perform an initialization comprising connecting to a data management structure; exporting an explain text of the request in a known format; and disconnecting from the data management structure. Embodiments also in response to initialization, performing a shredding step comprising shredding the explain text of the request; and populating a plurality of metadata tables comprising a superset table required for internal processing; define or redefine a machine learning algorithm comprising a plurality of rulesets by calling a plurality of macros to act on the request; access a historic log comprising identified performance tuning parameters configured for tuning queries; and use the identified performance tuning parameters and the machine learning algorithm, optimize the query, thereby resulting in an optimized query.

In some embodiments, the data management structure is a Teradata structure.

Some embodiments, in response to optimizing the query, initiate transmission of the optimized query to the user.

Some embodiments, in response to optimizing the query, automatically implement the query. Some such embodiments receive, from one or more systems targeted by the optimized query, query results; and transmit the optimized query results to the user.

Some embodiments store a copy of the query, the optimized query, the identified performance tuning parameters and the machine learning algorithm in the historic log for use in optimization of future queries.

Some such embodiments access the historical log to determine similarities between a second query from a second user and the query from the user; access the identified performance tuning parameters and the machine learning algorithm in the historical log; use at least a portion of the identified performance tuning parameters and at least a portion of the machine learning algorithm to generate a second set of identified performance tuning parameters and a second machine learning algorithm; and apply the second set of identified performance tuning parameters and the second machine learning algorithm to the second query to optimize the second query, thereby resulting in a second optimized query.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
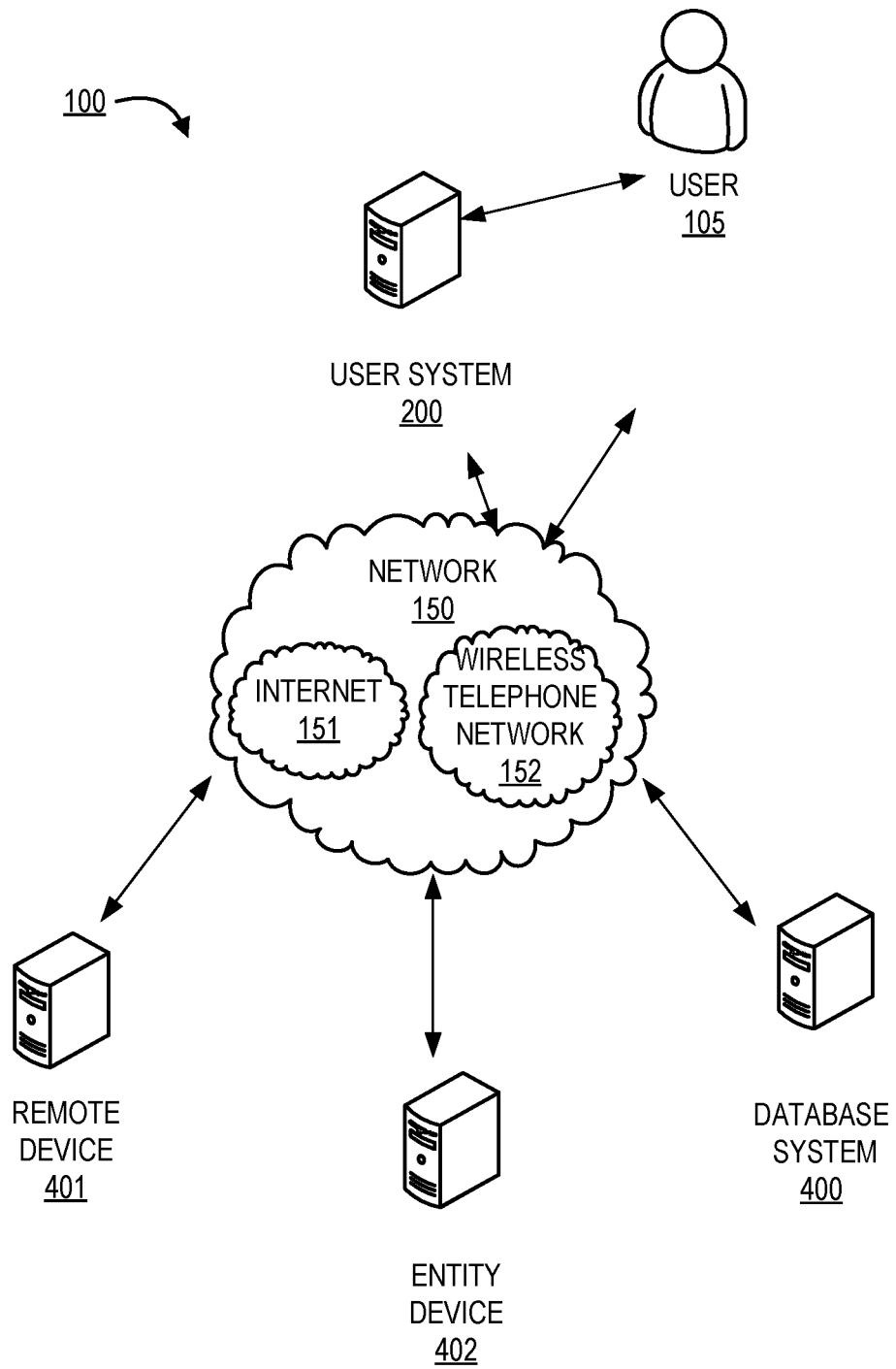
Figure 2:
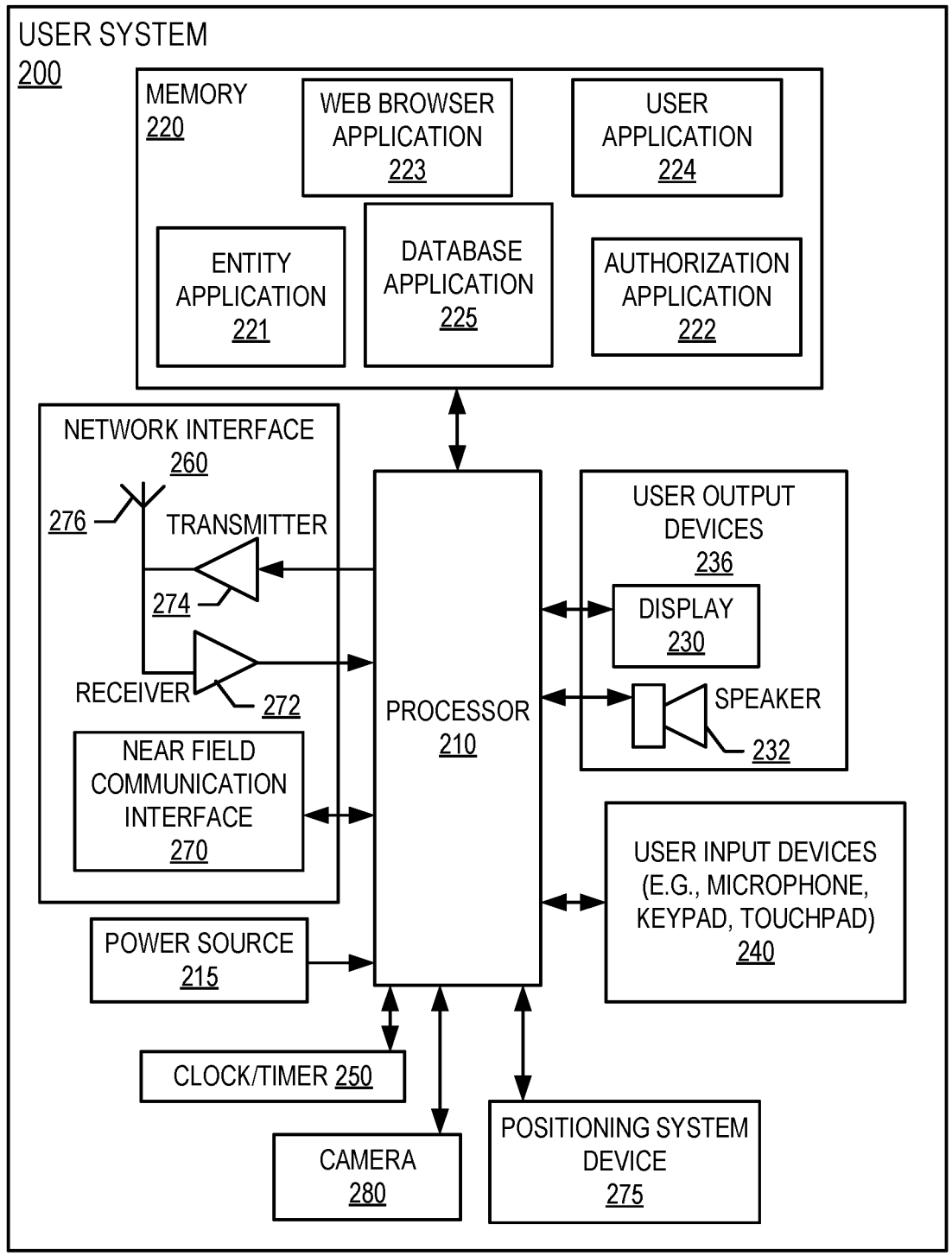
Figure 3:
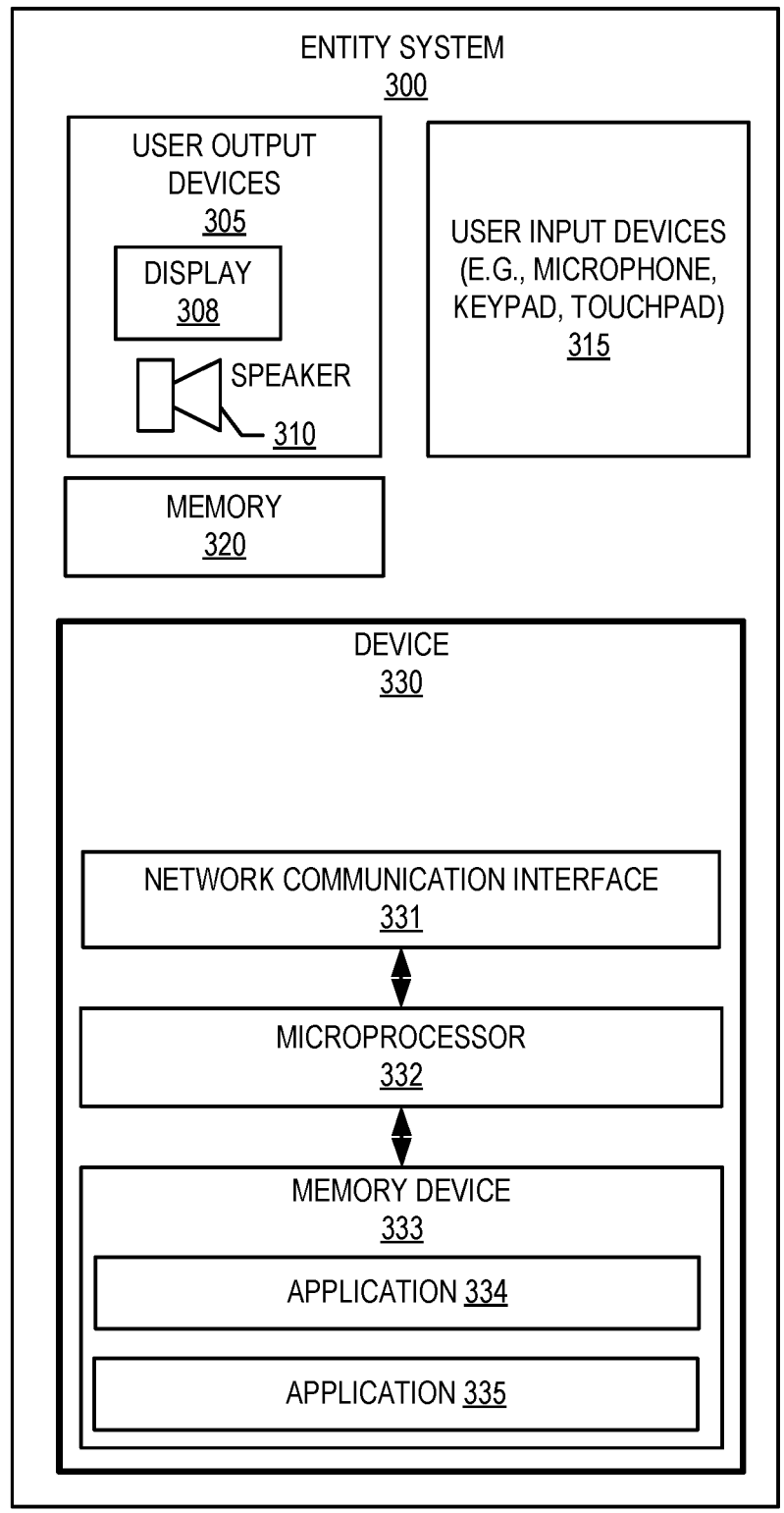
Figure 4:
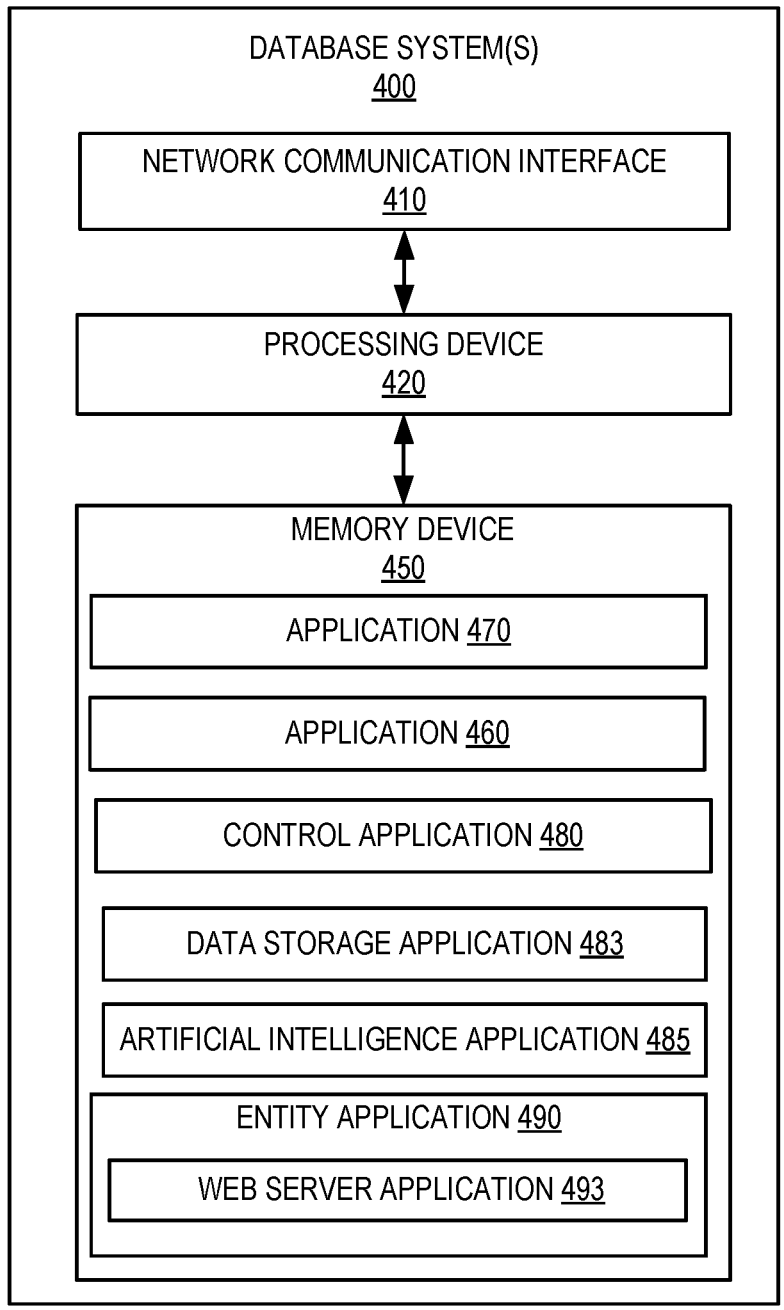
Figure 5:
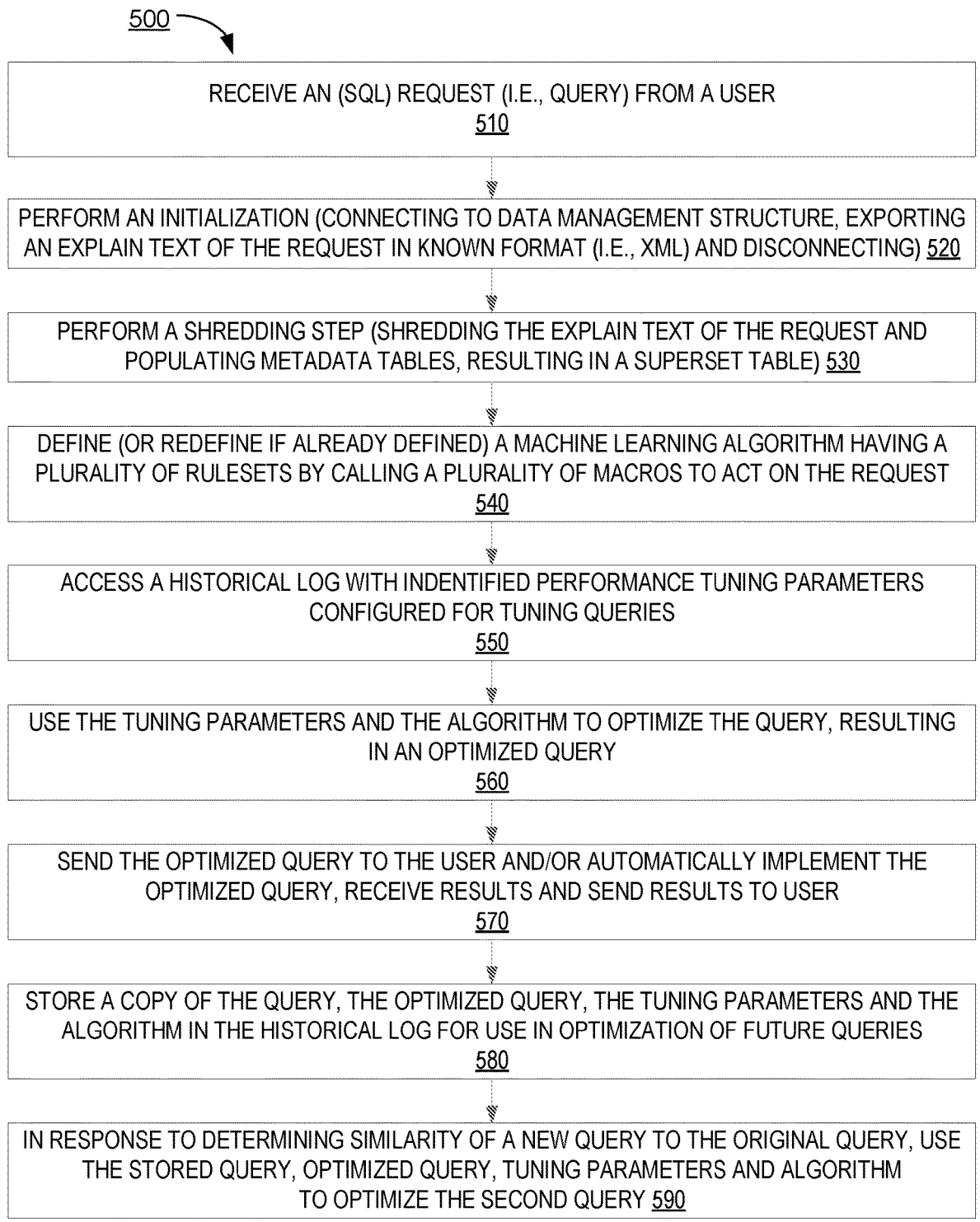
Figure 6:
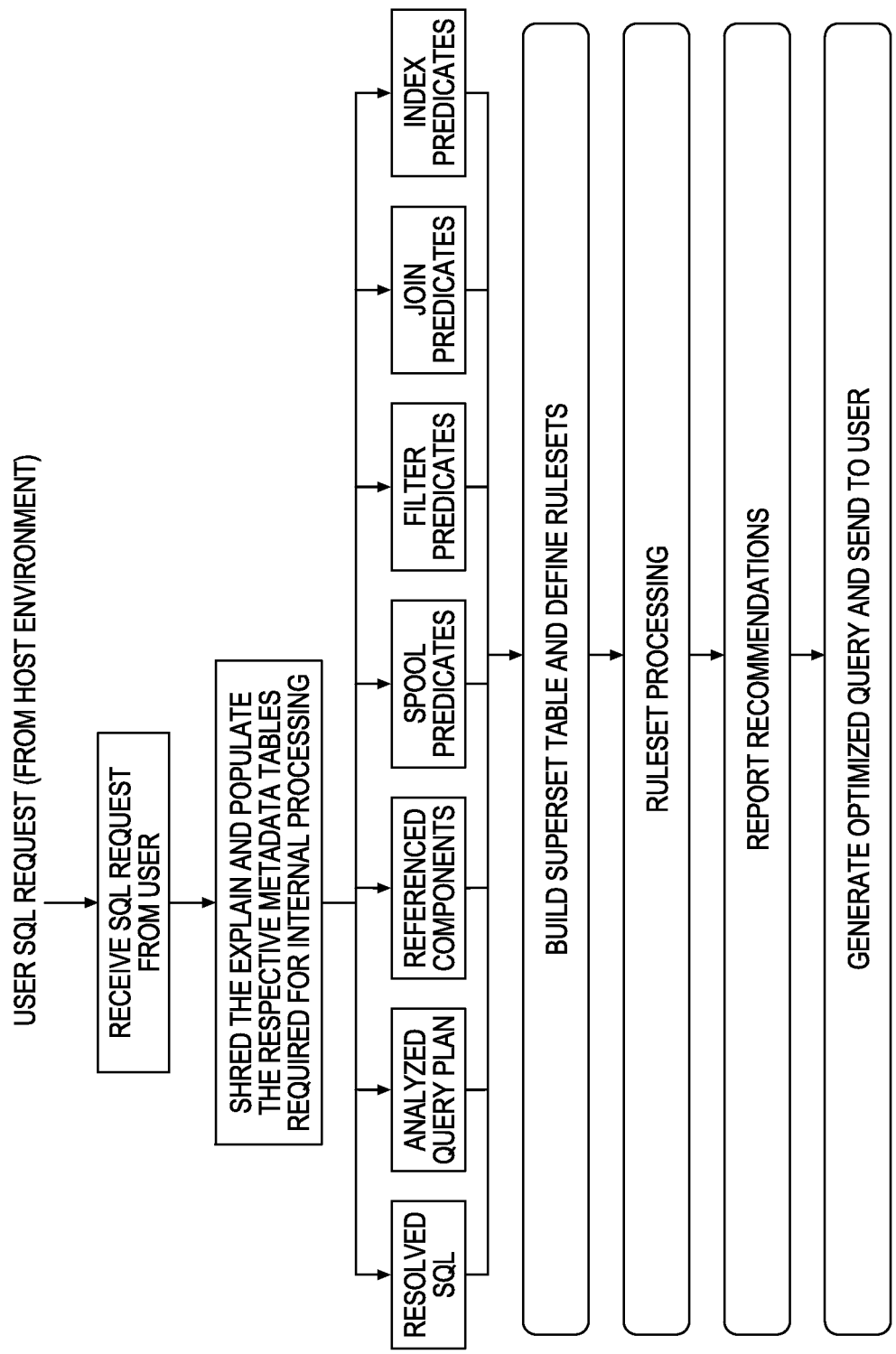
Figure 7:
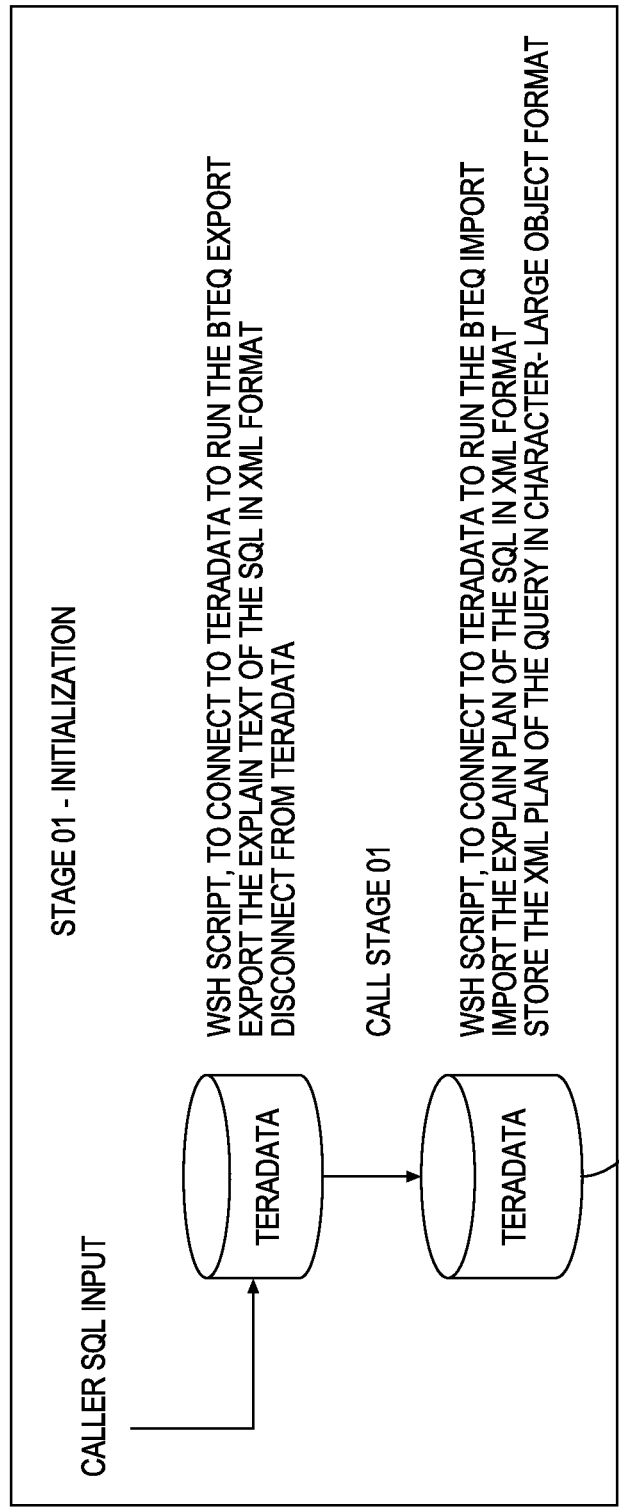
Figure 8:
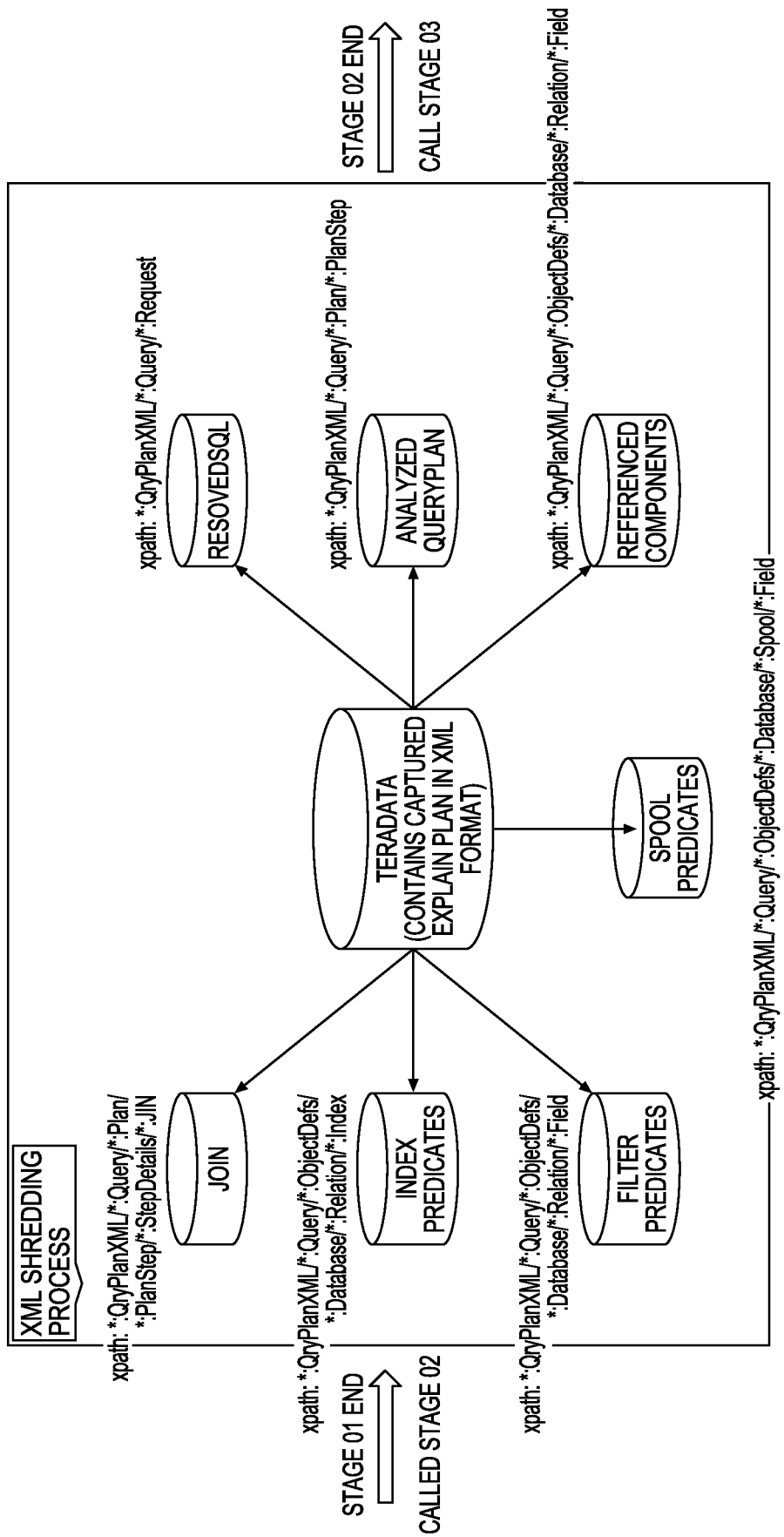
Figure 9:
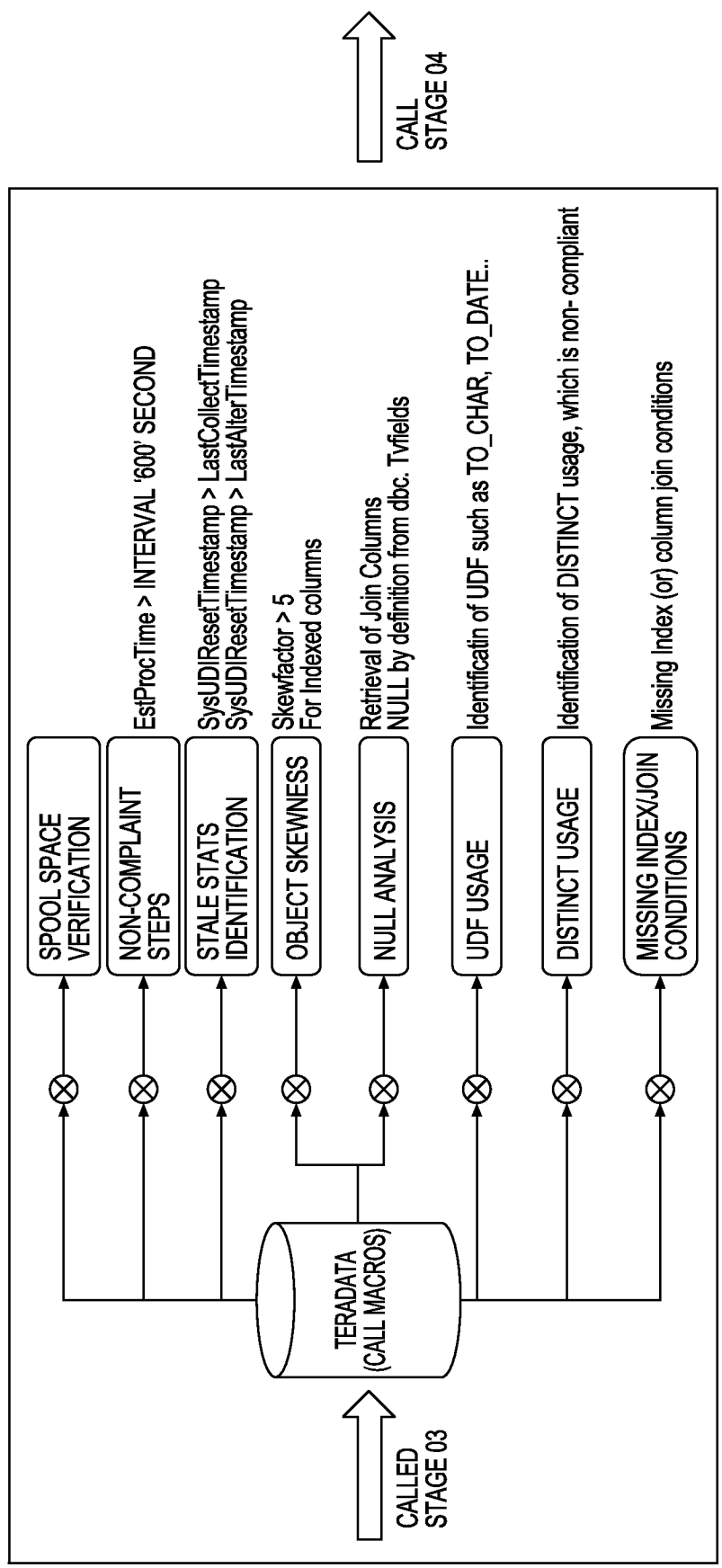
Figure 10:
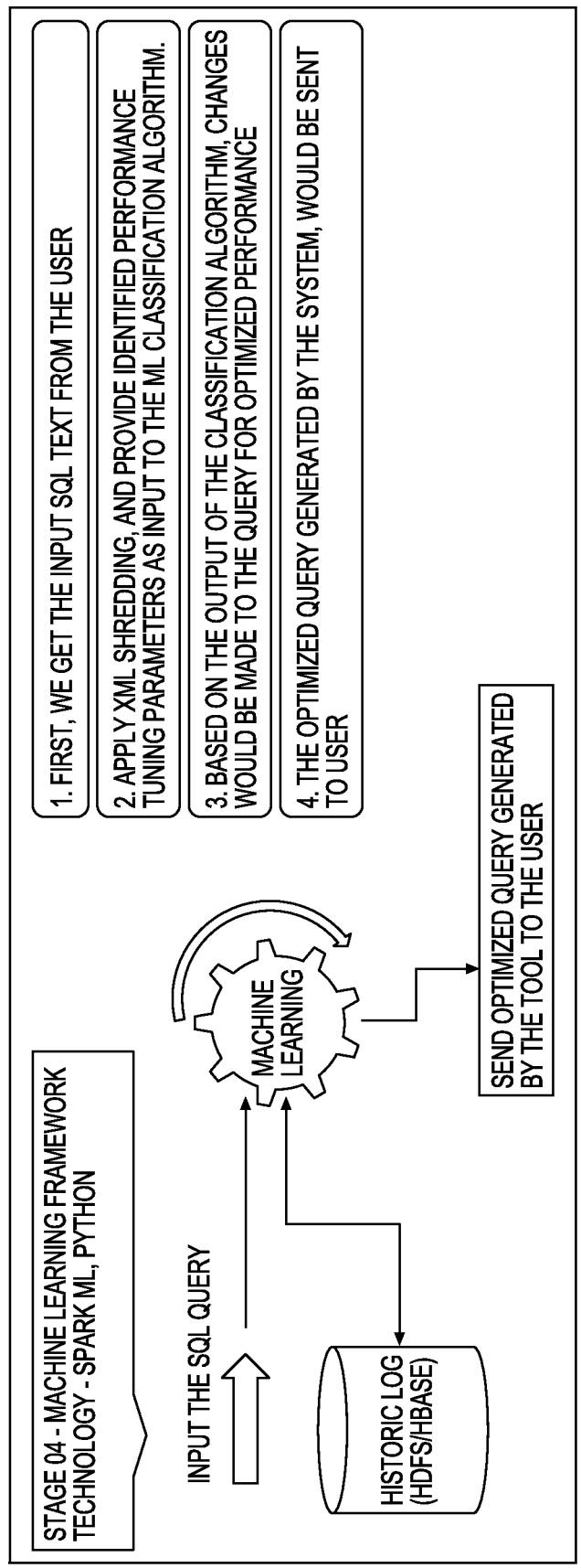

Having thus described embodiments of the invention in general terms, reference will be made to the accompanying drawings, where:

FIG. 1 presents a data query optimizing system environment, in accordance with an embodiment of the present invention;

FIG. 2 presents a block diagram illustrating a user device, in accordance with an embodiment of the present invention;

FIG. 3 presents a block diagram illustrating an entity system, in accordance with an embodiment of the present invention;

FIG. 4 presents a block diagram illustrating a database system, in accordance with an embodiment of the present invention;

FIG. 5 presents a process flow for analyzing, optimizing, and remediating a proposed data query prior to query implementation, in accordance with an embodiment of the present invention;

FIG. 6 presents a high level process flow for analyzing, optimizing, and remediating a proposed data query prior to query implementation, in accordance with an embodiment of the present invention;

FIG. 7 presents a process flow for initializing the process described herein, in accordance with an embodiment of the present invention;

FIG. 8 presents a process flow for shredding an explain plan of a query, in accordance with an embodiment of the present invention;

FIG. 9 presents a process flow for building tables and defining rulesets, in accordance with an embodiments of the present invention; and FIG. 10 presents a process flow for implementing an artificial intelligence engine to optimize queries, according to embodiments of the present invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Teradata® is a data management and analytics company and platform that provides integrated data warehousing, big data architectures and software, cloud services for data analytics, data lake products, advanced analytics and HADOOP and open source solutions. As used herein, reference to Teradata refers to its integrated data warehousing, architecture, cloud services and analytics. As used herein, an example of a data management structure is one or more of the Teradata solutions.

Teradata performance tuning typically poses a challenge considering the high volume of the data and the deep architectural knowledge required. Because many Teradata users (i.e., consumers) come from different relational database management system (RDBMS) backgrounds, such programmers may find it difficult to design their queries, thereby resulting in either SPOOL out or over-processing issues. Sometimes, the processes may be killed by the database administrator if the database consumes more resources than a predetermined threshold. Thus, entity remediation teams may receive and remediate numerous request for incident investigation related to performance issues in a given time period. For each such incident investigation, detailed business analysis may be required in order to identify problematic areas and multiple full-time employees may work to manage all critical failures that may affect business.

While entities may determine and implement best business practices, database query tuning is a niche skill as it requires detailed understandings of the system configurations and in some cases requires optimizing a dynamic plan and potentially solutions to reduce the processing resource consumption. Thus, based on tested results, a standard manual analysis helps to resolve only approximately 40% of the incident issues. The remaining issues requires substantial trial and error as similar techniques may not apply for all environments.

Thus, embodiments of the invention leverage a combination of a Teradata RDBMS, shell scripting, HADOOP, SPARK ML and PYTHON, as well as a .Net web and reporting tools for the presentation layer of the system. The innovative tool analyzes each and every step of a query plan against a current configuration of the system, log history, user profile, relational set, deep dive on the impacted data and compares the allocated versus the required spool. The tool analyzes a host of performance remediation parameters including spool space, non-compliant steps as per the threshold defined for the system, stale statistics, User-Defined Function (UDF) usage, join strategy, processing and input/output skew, unnecessary input/output and system impact. The tool is easily deployable to all Teradata users and no deep architecture knowledge is required. A user can run the tool as many times as necessary and the problematic queries will be remediated by optimizing the query by re-writing it.

FIG. 1 provides a block diagram illustrating an environment 100 wherein a system for analyzing, optimizing and remediating a proposed data query prior to query implementation may be implemented. Likewise, the environment may enable a real-time artificial intelligence engine for leveraging historical data as discussed below. As depicted in FIG. 1, the operating environment 100 may include a user system or user device 200 that may include one or more user systems (i.e., user devices), computer, servers, network and/or the like. As shown, the user system may communicate with other devices and systems or over the network 150 or embodiments of the invention may establish communication linkages directly or indirectly between and/or among two or more of the devices that are part of the environment 100.

In various embodiments, the environment may also include a database system 400 interacting with the user system 200 of a user 105, one or more remote devices 401, one or more entity devices 402, and/or one or more database system(s) 400 using a network 150 that includes an internet 151 and wireless telephone network 152. In some embodiments, the database system 400 may be maintained by a financial institution. In some embodiments, the database system 400 may be owned and maintained by the financial institution. The user 105 and other plurality of users may be system resources (hardware and/or software), customers of the entity, or third party entities.

The environment 100 also may include a plurality of computing devices of the user 105. The computing devices may include any machine, apparatus, system or the like that may be connected to and communicate with other devices over a network 150. The user system 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology.

Referring now to FIG. 2, the user system 200 may be any computing device utilized by the user 105. In embodiments of the present invention, the user system may be any device of the user connected to the database system(s) via a direct wired (e.g., USB port), indirect wired/wireless (e.g., over the network) or direct wireless technology (e.g., Bluetooth). The user system may be any system, server, computing resource consumer, wearable device, laptop, mobile device, smart phone device, PDA, tablet, or any other mobile device. In one embodiment of the invention, there may be multiple user systems.

Some embodiments of the user system 200 include a processor 210 communicably coupled to such devices as a memory 220, user output devices 236, user input devices 240, and a network interface 260. The user system 200 further includes a power source 215, such as a battery, for powering various circuits and other devices that are used to operate the user system 200. Embodiments of the user system 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the user system 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223. The web browser application 223 may then allow the user system 200 to transmit and receive web content, such as, for example, location-based content and/or other web page content, according to a Wireless Application Protocol (WAP), Hypertext Transfer Protocol (HTTP), and/or the like. The memory device 220 may include other applications such as entity application 221, a user application 224, database application 225, authorization application 222, and/or the like. In some embodiments, the database application 225 may be a part of the entity application 221. In some embodiments, entity application 221 may be a mobile banking application. The database application 225 interacts with the database system(s) 400 to perform one or more functions. In some embodiments, the authorization application 222 allows the user system 200 to interact with entity systems and database system(s) 400.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the user system 200 may be configured to operate with one or more air interface standards, communication protocols, modulation types, and access types. By way of illustration, the user system 200 may be configured to operate in accordance with any of a number of first, second, third, and/or fourth-generation communication protocols and/or the like. For example, the user system 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The user system 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the user system 200. In some embodiments, the NFC interface 270 is not supported in and/or on the user system 200, but the NFC interface 270 is otherwise operatively connected to the user system 200 (e.g., where the NFC interface 270 is a peripheral device plugged into the user system 200). Other apparatuses having NFC interfaces mentioned herein may be configured similarly. In some embodiments, the NFC interface 270 of the user system 200 is configured to contactlessly and/or wirelessly communicate information to and/or from a corresponding NFC interface of another apparatus (e.g., a point of sale (POS) device, an automated teller machine (ATM) or another mobile or computing device). In one embodiment of the present invention, the NFC interface of the user system 200 wirelessly communicates information (virtual card information such as virtual card number, CVV code, expiration date) stored in the user application 224 to perform a transaction.

As described above, the user system 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the user system 200 to transmit data, may include any of a number of devices allowing the user system 200 to transmit data, such as a keypad, keyboard, touch-screen, touchpad, microphone, mouse, joystick, other pointer device, button, soft key, and/or other input device(s). The user interface may also include a camera 280, such as a digital camera.

The user system 200 may also include a positioning system device 275 that is configured to be used by a positioning system to determine a location of the user system 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the user system 200. In other embodiments, the positioning system device 275 includes a proximity sensor or transmitter, such as an RFID tag, that can sense or be sensed by devices known to be located proximate a location to determine that the user system 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the user system 200 and/or one or more of the process/method steps described herein. For example, in one embodiment, a memory device may include any computer memory that provides an actual or virtual space to temporarily or permanently store data and/or commands provided to a processing device when it carries out its functions described herein. In some embodiments, data, profiles, or the like may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices These applications also typically provide a graphical user interface (GUI) on the display 230 that allows the user 105 to communicate with the user system 200, and/or other devices or systems. The memory 220 can also store any of a number of pieces of information, and data, used by the user system 200 and the applications and devices that make up the user system 200 or are in communication with the user system 200 to implement the functions of the user system 200 and/or the other systems described herein. For example, the memory 220 may include such data as user authentication information.

Referring now to FIG. 3, the entity system 300 comprises one or more components. The entity system 300 may be any computer, system, server or the like, and may include user input devices 315, memory 320, positioning system device 325, and a device 330. As shown in the FIG. 3, the device 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the device 330 may utilize a transceiver of the a device. The microprocessor 332 is configured to provide signals to and receive signals from the transmitter and receiver, respectively. The device 330 may utilize wireless network including satellite or any other wireless network of the a device to provide signals and receive signals. In some embodiments, the device 330 may utilize wireless network of the user system 200 connected to the a device system 300 to provide signals and receive signals to perform one or more steps in the process flows described below. The device 330 may be configured to raise certain triggers and alert the database system upon occurrence on any of one or more conditions. For example, the device may identify an input from a user via any of the user input devices and may alert the system.

The network communication interface 331 may also include a near field communication (NFC) interface. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, carried, and/or otherwise supported in and/or on the user system 200. In some embodiments, the NFC interface is not supported in and/or on the user system 200, but the NFC interface is otherwise operatively connected to the user system 200. For example, user system 200 may be internally connected to the electronic and communication system of the entity system and may utilize the NFC interface of the entity system. In some embodiments, the NFC interface of the user system 200 is configured to contactlessly and/or wirelessly communicate information to and/or from a corresponding NFC interface of another apparatus (e.g., a point of sale (POS) device, an automated teller machine (ATM) or another mobile, remote device, vendor entity devices, or computing device).

The memory device 333 may include one or more applications or information accessed or received by the device 330. The memory device, as shown, comprises one or more applications including application 334, application 335, and/or the like. The application 334 may be a network server configured to cause the microprocessor to interact with other components of the environment, user system 200, database system 400, remote device 401, entity device 402, and/or other device associated with the network 150. One or more of the applications may be utilized to receive and communicate information to the database system 400 to perform one or more steps in the process flow described herein.

FIG. 4 provides a block diagram illustrating the database system(s) 400, in greater detail, in accordance with embodiments of the invention. As illustrated in FIG. 4, in one embodiment of the invention, the database system 400 includes one or more processing devices 420 operatively coupled to a network communication interface 410 and a memory device 450. In certain embodiments, the database system 400 is operated by a financial institution, such as a financial institution. In some embodiments, the database system 400 is part of a system of the system 300, wherein the database system 400 may be embedded within any component of the a device.

In some embodiments, the database system 400 may be an independent system, wherein the database system 400 communicates with the a device to perform one or more actions described in the process flows below via the device 330. In such an embodiment, the system establishes a communication link. For example, the system may communicate with user input devices 315, positioning device 325, other components 328, and user output devices 305.

In one embodiment, the database system 400 is part of a financial institution system. In such an embodiment, an application performing the operations of the database system 400 is stored in the entity system. In such embodiments, the device may be configured to perform one or more steps of the process flows described herein and the database system monitors and controls one or more of the other systems or devices in the environment required to perform the one or more steps.

It should be understood that the memory device 450 may include one or more applications and one or more databases or other data structures/repositories. The memory device 450 also includes computer-executable program code that instructs the processing device 420 to operate the network communication interface 410 to perform certain communication functions of the database system 400 described herein. For example, in one embodiment of the database system 400, the memory device 450 includes, but is not limited to, a network server application 470, a database application 470, control application 480, a data storage application 483, artificial intelligence engine application 485 and other computer-executable instructions or other data. The computer-executable program code of the network server application 470, the database application 470, the control application 480, and the data storage application 483, artificial intelligence engine application 485 may instruct the processing device 420 to perform certain logic, data-processing, and data-storing functions of the database system 400 described herein, as well as communication functions of the database system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150. The database system 400, communicates with remote devices 401 and vendor entity devices 402 to perform various steps described herein. In some embodiments, the database system 400, communicates with other systems such as traffic monitoring system, entity system, authorization systems, and/or the like. The database system 400 also comprises an artificial intelligence engine.

FIG. 5 presents a process flow 500 for optimizing queries. The first step, as represented by block 510, is to receive a request (such as a query) from a user. The next step, as represented by block 520, is to perform an initialization of the process. This initialization step, which may also be referred to as stage one of the process, may include connecting to a data management structure (such as one or more Teradata products). The next stage of the process is the shredding stage, as represented by block 530. This step includes performing a shredding step that may include shredding the explain text of the request. The explain text may be part of the query that is formatted in XML. This phase also includes populating metadata tables, resulting in a superset table.

Next, as represented by block 540, the process includes defining (or redefining if already defined) a machine learning algorithm having a plurality of rulesets by calling a plurality of macros to act on the request (i.e., query). Then, as represented by block 550, the process includes accessing a historical log with identified performance tuning parameters configured for tuning queries. Next, as represented by block 560, the process uses the tuning parameters and the algorithm to optimize the query, resulting in an optimized query. Next, as represented by block 570, the process send the optimized query to the user and/or automatically implements the optimized query, receive results and send results to user. Then, as represented by block 580, the process stores a copy of the query, the optimized query, the tuning parameters and the algorithm in the historical log for user in optimization of future queries. Finally, as represented by block 590, is in response to determining similarity of a new query to the original query, to use the stored query, optimized query, tuning parameters and algorithm to optimize the second query.

Referring now to FIG. 6, a flowchart illustrates a high level process for analyzing, optimizing, and remediating a proposed data query prior to query implementation, in accordance with an embodiment of the present invention. As shown, the first step of the overall process is receiving an SQL request from a host environment (and/or from a user). This stage is also referred to as initialization. Initialization is broken down into additional detail as shown in FIG. 7, as discussed further below.

As shown in FIG. 7, the initialization process involves a caller SQL input into Teradata. A WSH script is run that connects to Teradata to run the BTEQ export. The explain text of the SQL in XML format is exported and then the process disconnects from Teradata. This is call stage one (1).

Next, a WSH script connecting to a data management structure such as Teradata to run the BTEQ import. The explain plan of the SQL is imported in XML format and stored in character-large object format. Once this is done, the process moves on to overall process stage two as discussed below.

The next overall process stage is the XML shredding process as illustrated in further detail in FIG. 8 below. In this stage, the explain plan is shredded and the system populates the respective metadata tables required for internal processing. In the shredding process, the system shreds the captured explain plan in XML format, thereby resulting in resolved SQL, an analyzed queryplan, referenced components, join predicates, index predicates, filter predicates, and spool predicates.

The next stage of the overall process, as illustrated in more detail in FIG. 9 below is to call a number of macros, which affect spool space verification, non-compliant steps, stale stats identification, object skewness, null analysis (retrieval of join columns), User-Defined Function (UDF) usage (identification of UDF), distinct usage (identification of distinct usage, which is non-compliant), missing index/ and join conditions (missing index or column join conditions).

As shown below in FIG. 10, the next stage of the overall process is the machine learning framework. As noted, the SQL query is input into the machine learning framework and a historic log (HDFS/HBASE) is accessed. The machine learning framework applies an SML shredding and provides the identified performance tuning parameters as input to the machine learning classification algorithm. Then, based on the output of the classification algorithm, the machine learning framework makes necessary changes to the query for optimized performance. The optimized query generated by the system is then sent to the user.

In conclusion, generally forecasting Teradata system resources and performance predicates do not consider the current Teradata environment, dynamic calculations using Machine/Deep learning algorithms and the business criticality. The present invention provides solutions for these problems by providing a system that, based on the detailed analysis and the data collected (and stored in the historical log), the automatic assistance framework predicates the flaws and assists the tuning recommendations for each category level using the Machine and Deep learning algorithms. The system then applies a query re-write pattern or collects the required missing or stale statistics.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for analyzing, optimizing and remediating a proposed data query prior to query implementation, the system comprising: one or more memory devices having computer readable code stored thereon one or more processing devices operatively coupled to the one or more memory devices, wherein the one or more processing devices are configured to execute the computer readable code to: receive a proposed data query from a user; in response to receiving the proposed data query, perform an initialization comprising: connecting to a data management structure; exporting an explain text of the proposed data query in a known format; disconnecting from the data management structure; in response to initialization, performing a shredding step comprising: shredding the explain text of the proposed data query; and populating a plurality of metadata tables comprising a superset table required for internal processing; define or redefine a machine learning algorithm comprising a plurality of rulesets by calling a plurality of macros to act on the proposed data query; access a historic log comprising identified performance tuning parameters configured for tuning queries; use the identified performance tuning parameters and the machine learning algorithm, optimize the proposed data query, thereby resulting in an optimized query; store a copy of the proposed data query, the optimized query, the identified performance tuning parameters and the machine learning algorithm in the historic log; in response to receiving a second proposed data query, access the historical log to determine similarities between a second proposed data query and the proposed data query; in response to determining similarities, (i) access the identified performance tuning parameters and the machine learning algorithm in the historical log and (ii) use at least a portion of the identified performance tuning parameters and at least a portion of the machine learning algorithm to generate a second set of identified performance tuning parameters and a second machine learning algorithm; and apply the second set of identified performance tuning parameters and the second machine learning algorithm to the second proposed data query to optimize the second proposed data query, thereby resulting in a second optimized query.

2. The system of claim 1, wherein the data management structure is a Teradata structure.

3. The system of claim 1, wherein the one or more processing devices are further configured to execute the computer readable code to:
   in response to optimizing the proposed data query, initiate transmission of the optimized query to the user.

4. The system of claim 1, wherein the one or more processing devices are further configured to execute the computer readable code to:
   in response to optimizing the proposed data query, automatically implement the optimized query.

5. The system of claim 4, wherein the one or more processing devices are further configured to execute the computer readable code to:
   receive, from one or more systems targeted by the optimized query, query results; and
   transmit the optimized query results to the user.

6. A computer program product for analyzing, optimizing and remediating a proposed data query prior to query implementation, the computer program product comprising at least one non-transitory computer-readable medium having computer-readable program code portions embodied therein, the computer-readable program code portions comprises one or more executable portions to: receive a proposed data query from a user; in response to receiving the proposed data query, perform an initialization comprising: connecting to a data management structure; exporting an explain text of the proposed data query in a known format; disconnecting from the data management structure; in response to initialization, performing a shredding step comprising: shredding the explain text of the proposed data query; and populating a plurality of metadata tables comprising a superset table required for internal processing; define or redefine a machine learning algorithm comprising a plurality of rulesets by calling a plurality of macros to act on the proposed data query; access a historic log comprising identified performance tuning parameters configured for tuning queries; use the identified performance tuning parameters and the machine learning algorithm, optimize the proposed data query, thereby resulting in an optimized query; store a copy of the proposed data query, the optimized query, the identified performance tuning parameters and the machine learning algorithm in the historic log; in response to receiving a second proposed data query, access the historic al log to determine similarities between a second proposed data query and the proposed data query; in response to determining similarities, (i) access the identified performance tuning parameters and the machine learning algorithm in the historical log and (ii) use at least a portion of the identified performance tuning parameters and at least a portion of the machine learning algorithm to generate a second set of identified performance tuning parameters and a second machine learning algorithm; and apply the second set of identified performance tuning parameters and the second machine learning algorithm to the second proposed data query to optimize the second proposed data query, thereby resulting in a second optimized query.

7. The computer program product of claim 6, wherein the data management structure is a Teradata structure.

8. The computer program product of claim 6, wherein the computer-readable program code portions comprises one or more executable portions to:
   in response to optimizing the proposed data query, initiate transmission of the optimized query to the user.

9. The computer program product of claim 6, wherein the computer-readable program code portions comprises one or more executable portions to:
   in response to optimizing the proposed data query, automatically implement the optimized query.

10. The computer program product of claim 9, wherein the computer-readable program code portions comprises one or more executable portions to:
    receive, from one or more systems targeted by the optimized query, query results; and
    transmit the optimized query results to the user.

11. A computer implemented method for analyzing, optimizing and remediating a proposed data query prior to query implementation, the method comprising: receiving a proposed data query from a user; in response to receiving the proposed data query, perform an initialization comprising: connecting to a data management structure; exporting an explain text of the proposed data query in a known format; disconnecting from the data management structure; in response to initialization, performing a shredding step comprising: shredding the explain text of the proposed data query; and populating a plurality of metadata tables comprising a superset table required for internal processing; defining or redefining a machine learning algorithm comprising a plurality of rulesets by calling a plurality of macros to act on the proposed data query; accessing a historic log comprising identified performance tuning parameters configured for tuning queries; and using the identified performance tuning parameters and the machine learning algorithm, optimize the proposed data query, thereby resulting in an optimized query; storing a copy of the proposed data query, the optimized query, the identified performance tuning parameters and the machine learning algorithm in the historic log; in response to receiving a second proposed data query, accessing the historical log to determine similarities between a second proposed data query and the proposed data query; in response to determining similarities, (i) accessing the identified performance tuning parameters and the machine learning algorithm in the historical log, and (ii)

using at least a portion of the identified performance tuning parameters and at least a portion of the machine learning algorithm to generate a second set of identified performance tuning parameters and a second machine learning algorithm; and applying the second set of identified performance tuning parameters and the second machine learning algorithm to the second proposed data query to optimize the second proposed data query, thereby resulting in a second optimized query.

12. The method of claim 11, wherein the data management structure is a Teradata structure.

13. The method of claim 11, further comprising:
in response to optimizing the proposed data query, initiating transmission of the optimized query to the user.

14. The method of claim 11, further comprising:
in response to optimizing the proposed data query, automatically implementing the optimized query.

15. The method of claim 14, further comprising:
receiving, from one or more systems targeted by the optimized query, query results; and
transmitting the optimized query results to the user.

* * * * *